Nov. 26, 1957     T. DREIER ET AL     2,814,766
TRANSDUCER SYNCHRONIZED CLOCK
Filed May 25, 1955
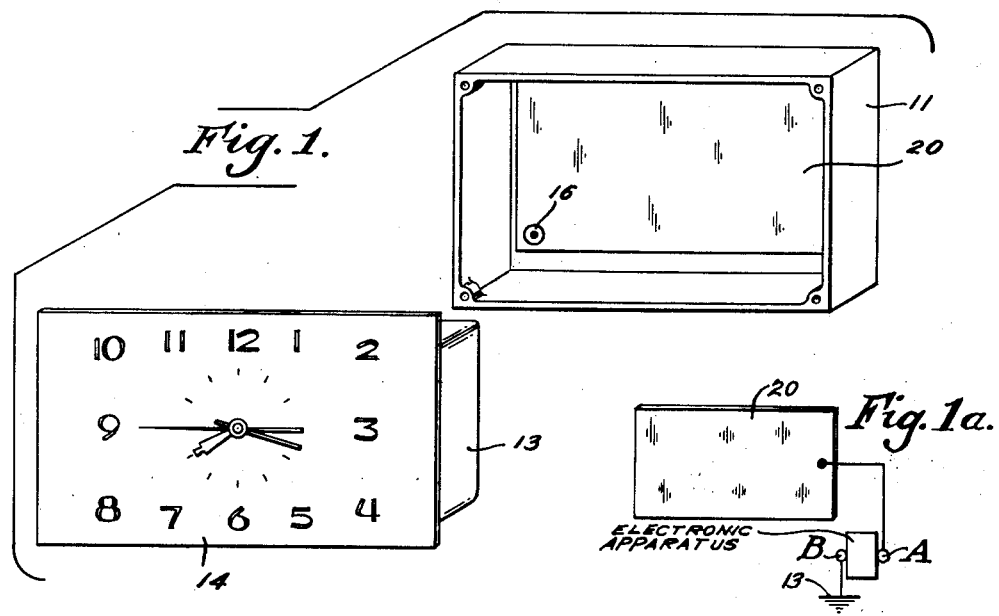
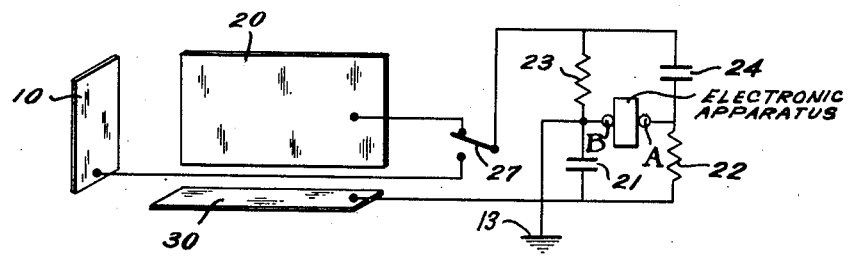
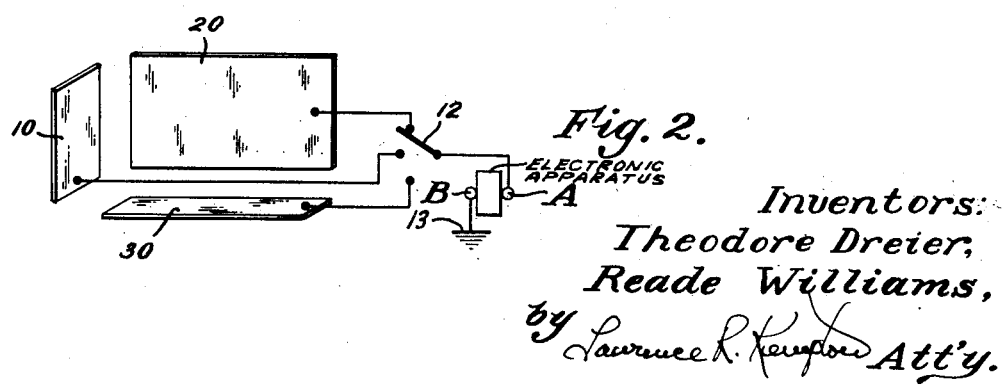
Inventors:
Theodore Dreier,
Reade Williams,
by Laurence R. Kempton Atty.

United States Patent Office 2,814,766
Patented Nov. 26, 1957

2,814,766

TRANSDUCER SYNCHRONIZED CLOCK

Theodore Dreier, Sherborn, and Reade Williams, Framingham, Mass., assignors to General Electric Company, a corporation of New York Application May 25, 1955, Serial No. 511,016

7 Claims. (Cl. 318—16)

This invention relates to synchronous electric clocks, and more particularly it relates to a capacitive transducer for deriving an alternating current synchronizing signal from an alternating field of horologically controlled frequency to regulate the speed of an electric clock.

In the copending application of T. Dreier and I. A. Terry, application Serial No. 581,139, filed April 27, 1956, now Patent Number 2,786,972, and assigned to the same assignee as the present invention, there is disclosed a system for motivating clockworks which employs locally generated alternating current having its frequency controlled by a synchronizing signal to power a small synchronous motor. The synchronizing signal is derived from either an electric or magnetic field produced by ordinary commercial alternating power whose frequency, as is well known, is held relatively constant on the average by means of master horological control. In this way highly accurate time indication is made possible without the necessity for a direct electrical connection to the clock.

It is an object of the present invention to provide a novel electric field sensing device or capacitive transducer of inherently simple construction which is entirely contained within the case of the clock and therefore does not detract from its aesthetic qualities.

It is a further object of the invention to provide an electric field sensing device to derive a synchronizing signal of maximum strength from the frequency controlled alternating field as nearly independent of the direction of said field as possible.

The novel features of this invention together with further objects and advantages thereof will become more readily apparent when considered in connection with the accompanying drawing wherein:

Fig. 1 is an exploded view in perspective of a clock provided with a transducer in accordance with the invention;

Fig. 1a is a diagrammatic view of the transducer of Fig. 1;

Fig. 2 is a diagrammatic view of a modification of the transducer of Fig. 1 in accordance with the invention; and Fig. 3 is a diagrammatic view of a further modification of the transducer of Fig. 1 in accordance with the invention.

Referring now to the drawing, wherein like elements are designated by the same reference characters, and referring more particularly to Fig. 1, there is illustrated a clock with which the transducer of the present invention is to be used, said clock having a case 11 of non-conductive material, such as plastic, and a face 14 adapted to be fastened to the front of the case. Mounted on the back of face 14 is a metalized housing 13 for the electronic apparatus mentioned in connection with the aforementioned copending application of T. Dreier and I. A. Terry, and a preferred embodiment of which may be found in the copending application of applicant, Serial No. 511,015, filed May 25, 1955, assigned to the general Electric Company, assignee of the instant application. As regards the present invention, it is significant only that housing 13 forms ground for the apparatus and a pair of terminals A, B represent the input terminals of the electronic apparatus.

Provided within case 11, and more particularly being joined to the larger of its inner surfaces is a backing 20 of conductive material electrically insulated from the housing 13 by virtue of the insulating qualities of the case. As shown, backing 20 is formed with a sheet of metal foil cemented to the case or caused to adhere thereto in any other suitable manner. Alternatively, backing 20 may comprise a metalized coating applied to the case in any suitable manner, such as in liquid form.

Referring now to both Figs. 1 and 1a, it will be observed that the backing 20 is connected to the terminal A as by a contact disk 16, and a suitable lead wire associated therewith, whereas terminal B is connected to the aforementioned ground 13 as shown.

In operation, metal backing 20 forms with housing 13 the equivalent of a capacitive element whereon charges of opposite polarity are induced by an electric field in its vicinity. If the field is an alternating one, as is produced by commercial alternating power supply media, charges whose polarity is periodically reversed will be induced on backing 20 and housing 13 giving rise to an alternating potential difference or voltage therebetween. Ordinarily, the magnitude of the voltage derived in this way from stray electric fields found in a home, for example, will be adequate for use in synchronizing the oscillatory electronic apparatus aforementioned owing to the relatively large conductive areas as are afforded by the surface of the housing and the backing.

Referring now to Fig. 2, there is illustrated diagrammatically a modification of the transducer of Fig. 1 wherein two additional backings 10 and 30 are employed together with a suitable selector switch 12 having its respective fixed terminals connected to the individual backings and its movable arm connected to terminal A. As is apparent backings 10 and 30 are perpendicular to one another and also to backing 20, and hence will be formed on mutually orthogonal inner walls of the clock case 11 in like manner as backing 20.

In operation of the modification of Fig. 2, each of the metal backings 10, 20 and 30 forms with housing 13, the equivalent of a capacitive element so that each will have charges of periodically reversing polarity induced thereon when in the presence of an alternating electric field. Depending on the direction of the field, however, one of the backings will usually be charged to a greater extent than the others and therefore its potential will vary between wider limits relative to ground. Accordingly, by properly positioning switch 12, a connection from terminal A to the backing receiving the greatest charge is afforded, with the result that a maximum voltage is caused to appear across terminals A and B. In this way, the transducer can be made most highly sensitive to an electric field in its vicinity irrespective of the directional characteristics of the field. It should of course be mentioned in this regard that a number more or less than three backings may be optionally employed together with a suitable multi-position switch having a corresponding number of switch positions, one for each backing, since this possibility will no doubt occur to those skilled in the art.

Referring now to Fig. 3, there is illustrated a further modification of the transducer of Fig. 1 wherein all three of the conductive backings 10, 20 and 30 are employed, two of which are adapted to be connected in circuit with the electronic apparatus simultaneously. To this end, backing 30 is connected to terminals A and B through a resistor 22 and a capacitor 21, respectively, and a selectable one of backings 10 and 20 is connected to terminals A and B through a capacitor 24 and a resistor 23, respectively. Selection between backings 10 and 20 is afforded by a two position selector switch 27 interposed between backings 10, 20 and the junction of resistor 23 and capacitor 24. As before, terminals A and B comprise the input terminals of the oscillatory electronic apparatus, wherein terminal B is connected to ground.

In operation the modification of Fig. 3 is adapted to develop across terminals A and B a voltage whose magnitude is substantially independent of the direction of the components of the electric field in planes perpendicular to the two backings that are placed in circuit. This is accomplished by the phase shifting action of the network comprising capacitors 21, 24 and resistors 22, 23 whereby the individual voltages derived by backings 20 and 30 in combination with the housing 13 are caused to be substantially in quadrature phase with one another at terminals A and B. By optionally connecting backing 10 in circuit with the ground system rather than backing 20, an omnidirectional response characteristic as regards the components of the electric field in planes perpendicular to backings 10, 30 may also be obtained. Accordingly, in the modification of Fig. 3, by properly positioning switch 27, the combination of the two backings which provides the maximum voltage across terminals A and B may be selected in accordance with the plane in which the electric field predominates. If desired, however, one of the backings may be eliminated altogether and the two remaining ones connected in circuit permanently to provide a response characteristic that is still very nearly omnidirectional and may be sufficiently so for practical purposes.

As will be apparent to those skilled in the art, the invention is susceptible of various other modifications within its spirit and scope. For example, various other forms of backings on the inner surfaces of the clock case may be utilized and likewise in the modification of Fig. 3, other types of phase shifting networks may be employed. Therefore, it should be understood that the invention is not to be limited to the precise embodiment and modification thereof illustrated but rather is limited only by the scope of the appended claims.

What I claim as new and desire to secure by Letters Patent of the United States is:

1. In a clock powered by an electronic apparatus, a non-conductive clock case, a capacitive transducer to derive an alternating current signal voltage from an alternating electric field of horologically controlled frequency for synchronizing the electronic apparatus, said transducer comprising a backing of conductive material formed on at least one of the walls of the clock case, and means to connect said backing to said electronic apparatus, said backing acting as a capacitive element whereon an alternating signal voltage is induced by said alternating field.

2. In a clock powered by a grounded electronic apparatus, a non-conductive clock case, a capacitive transducer to derive an alternating current signal from an alternating electric field of horologically controlled frequency for synchronizing the electronic apparatus, said transducer comprising: at least two disjunctive backings of conductive material on mutually angular walls of the clock case; and means to connect at least one of said backings to said electronic apparatus according to the directive characteristics of said electric field, whereby a maximum potential difference is produced by said field between the selected backing and the ground system associated with the electronic apparatus.

3. In a clock powered by a grounded electronic apparatus, a non-conductive clock case, a capacitive transducer to derive an alternating current signal from an alternating electric field of horologically controlled frequency for synchronizing the electronic apparatus, said transducer comprising: at least two disjunctive backings of conductive material on mutually angular inner surfaces of the clock case; and a selector switch to selectively connect at least one of said backings to said electronic apparatus according to the directive characteristics of said electric field, whereby a maximum potential difference is produced by said field between the selected backing and the ground associated with the electronic apparatus.

4. A transducer according to claim 3 wherein said backings of conductive material comprise sheets of metalized foil secured to said inner surfaces of the clock case, respectively.

5. A transducer according to claim 3 wherein said backings of conductive material comprise metalized coatings to said inner surfaces of the clock case, respectively.

6. In a clock powered by an electronic apparatus, a non-conductive clock case, a capacitive transducer to derive an alternating current signal from an alternating electric field of horologically controlled frequency for synchronizing the electronic apparatus, said transducer comprising: at least two disjunctive backings of conductive material on mutually angular walls of the clock case, said backings being coupled to said electronic apparatus; and a phase shifting network connected between at least one of the backings and said electronic apparatus to cause the amplitude of the alternating current signal derived by the transducer to be substantially independent of the direction of the components of the electric field in planes perpendicular to the backings.

7. In a clock powered by an electronic apparatus, a non-conductive clock case, a capacitive transducer to derive an alternating current signal from an alternating electric field of horologically controlled frequency for synchronizing the electronic apparatus, said transducer comprising: at least three disjunctive backings of conductive material on substantially mutually orthogonal walls of the clock case; a selector switch to selectively couple a pair of said backings to said electronic apparatus; and a phase shifting network connected between at least one of the selected backings and said electronic apparatus to cause the amplitude of the alternating current signal derived by the transducer to be substantially independent of the direction of the components of the electric field in planes perpendicular to the selected backings.

No references cited.